Figure 1:
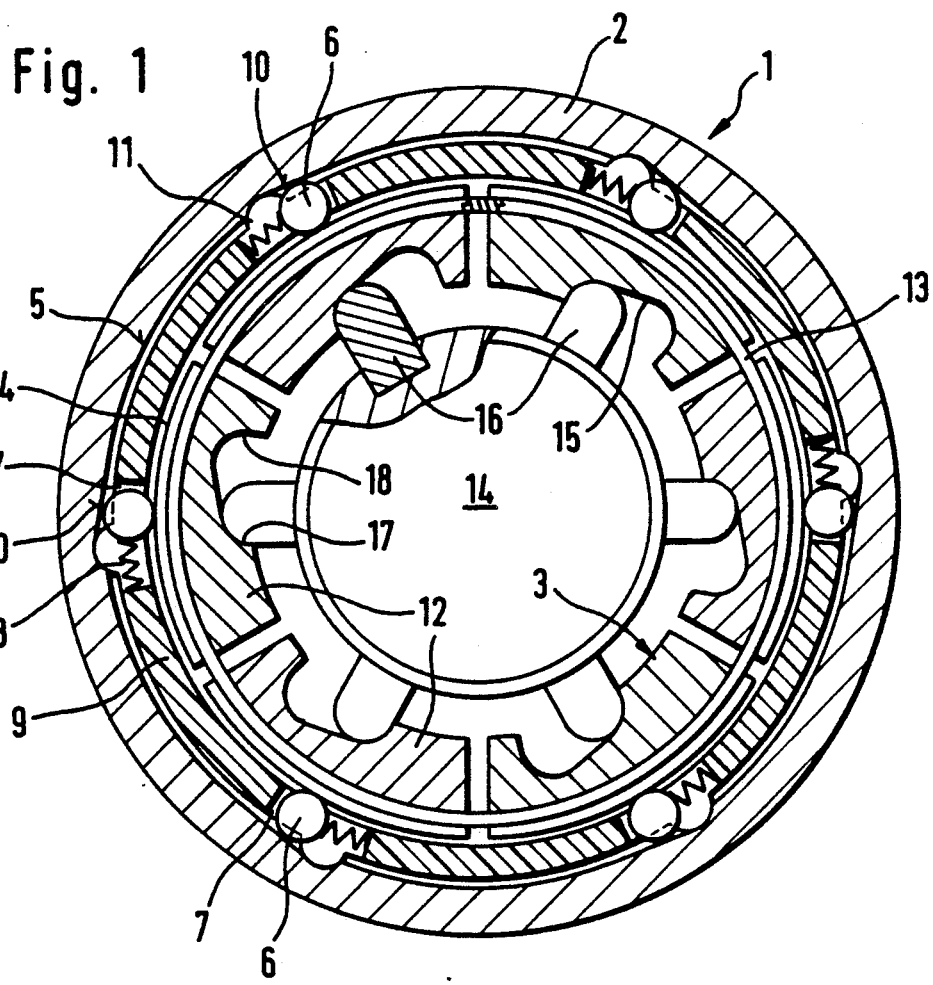

United States Patent [19]

Ritter et al.

[11] Patent Number: 5,067,598
[45] Date of Patent: Nov. 26, 1991

[54] LOAD-SWITCHING OVERRUNNING CLUTCH

[75] Inventors: Joachim Ritter, Herzogenaurach, Fed. Rep. of Germany; Harald Hochmuth, Emskirchen, Fed. Rep. of Germany

[73] Assignee: INA Walzlager Schaeffler KG, Fed. Rep. of Germany

[21] Appl. No.: 501,613

[22] Filed: Mar. 29, 1990

[30] Foreign Application Priority Data

Apr. 6, 1989 [DE] Fed. Rep. of Germany ....... 3911075

[51] Int. Cl.⁵ ............................................. F16D 41/07
[52] U.S. Cl. .................................... 192/7; 192/41 R; 192/45; 192/78
[58] Field of Search ................... 192/8 R, 41 R, 54, 7, 192/6 B, 73, 78, 45, 93 C; 188/82.8, 82.84, 134

[56] References Cited

U.S. PATENT DOCUMENTS

| | | |
|---|---|---|
| 865,666 | 9/1907 | Wendorff .................. 192/41 R X |
| 1,398,883 | 11/1921 | Mottlau ..................... 192/6 B |
| 1,471,398 | 10/1923 | Inglis ......................... 192/8 R |
| 1,956,417 | 4/1934 | Else .......................... 192/54 X |
| 2,031,783 | 2/1936 | Linder ....................... 192/45 |
| 2,039,149 | 4/1936 | Dodge ...................... 192/41 R X |
| 2,138,497 | 11/1938 | Mackowiak ............... 192/6 B |
| 2,143,330 | 1/1939 | Pray .......................... 188/82.8 |
| 2,251,588 | 8/1941 | Gilbert ...................... 192/54 |
| 2,293,085 | 8/1942 | Stieber ...................... 192/93 C X |
| 2,603,496 | 7/1952 | Richert ..................... 192/54 X |
| 3,021,925 | 2/1962 | Osborne .................... 188/82.8 |
| 3,166,169 | 1/1965 | Wade et al. ............... 192/45 |
| 3,204,737 | 9/1965 | Anner ....................... 192/54 X |
| 3,261,437 | 7/1966 | Kramm .................... 192/41 R |
| 4,049,103 | 9/1977 | Sessler ...................... 192/41 R X |

FOREIGN PATENT DOCUMENTS

| | | | |
|---|---|---|---|
| 0182994 | 6/1986 | European Pat. Off. . | |
| 888934 | 12/1943 | France ....................... | 192/8 R |
| 209155 | 1/1968 | U.S.S.R. .................... | 192/45 |

Primary Examiner—Rodney H. Bonck
Attorney, Agent, or Firm—Bierman and Muserlian

[57] ABSTRACT

An overrunning clutch comprising clamping rings arranged concentrially in each other with mutually facing clamping paths between which clamping elements are arranged and a switching member arranged equiaxially with one of the clamping rings which is designed to have a variable diameter, acting on this clamping ring by utilizing a wedge-surface effect so that a rotation of the switching member relative to the clamping ring with variable diameter causes a change in the distance between the clamping paths, characterized in that the clamping ring with variable diameter is divided by at least one axial slit and pre-tensioned by at least one spring to oppose the change in distance between the clamping paths which can be effected by the switching member.

18 Claims, 5 Drawing Sheets

LOAD-SWITCHING OVERRUNNING CLUTCH

Load-switching overrunning clutches comprising clamping rings arranged concentrically in each other with mutually facing clamping paths between which clamping elements are arranged and a switching member, arranged equiaxially with one of the clamping rings which is designed to have a variable diameter, acting on this clamping ring by utilizing a wedge-surface effect so that a rotation of the switching member relative to the clamping ring with variable diameter causes a change in the distance between the clamping paths are known. Load-switching overrunning clutches are used in all cases in which special operation conditions require a free wheel to be switched free in its clamping direction, i.e. when a temporary relative rotation between the inner and outer clamping ring is required. The switching-free is done as a rule via the cage by turning the cage relative to the clamping rings, whereby in the case of an overrunning clutch with clamping rollers, it displaces the clamping rollers out of the clamping region of the ramps or in the case of an overrunning clutch with clamping elements, causes the clamping elements to tilt into their free wheeling position.

In such constructions, considerable problems can arise with larger torques because the clamping elements are elastically deformed in the clamping position so that at switching-free the individual clamping elements spring out of the clamping position and cause switching impulses. In EP-OS 0,182,994, it has therefore been proposed to make one of the clamping rings of a clamping element overrunning clutch with very thin walls and to couple it by utilizing a wedge-surface effect with a switching member so that at a relative rotation of clamping ring and switching member, the diameter of the thin-walled clamping ring changes in an elastic manner and thereby increases or decreases, as the case may be, the distance between the clamping paths. In this way, the elastic deformations of the clamping elements in the clamping position can be reduced at switching-free by a radial movement of the clamping ring so that switching impulses do not occur at a subsequent switching-free via the cage. However, the elastic deformation of the clamping ring reduces the total life of the overrunning clutch, restricts the dimension of the permissible diameter variation and requires relatively long switching paths.

OBJECTS OF THE INVENTION

It is an object of the invention to provide a load-switching overrunning clutch which can be switched free by means of a diameter variation of a clamping ring, which attains a long working life and which operates with short switching paths.

This and other objects and advantages of the invention will become obvious from the following detailed description.

THE INVENTION

The novel overrunning clutch of the invention comprising clamping rings arranged concentrically in each other with mutually facing clamping paths between which clamping elements are arranged and a switching member arranged equiaxially with one of the clamping rings which is designed to have a variable diameter, acting on this clamping ring by utilizing a wedge-surface effect so that a rotation of the switching member relative to the clamping ring with variable diameter causes a change in the distance between the clamping paths is characterized in that the clamping ring with variable diameter is divided by at least one axial slit and pre-tensioned by at least one spring to oppose the change in distance between the clamping paths which can be effected by the switching member.

The fact that the clamping ring with variable diameter is divided by at least one axial slit and pre-tensioned by at least one spring to oppose the change in distance between the clamping paths which can be effected by the switching member achieves the advantagous of the invention.

A particularly favorable embodiment is obtained if the clamping ring with variable diameter is formed by at least two segments radially movable independently of each other and radially elastically pre-tensioned in the direction of increasing the distance between the clamping paths. In this case, the diameter variation is effected solely by radial displacements of the segments without their being elastically deformed. It is advantages to mount such segments at the switching member so that they can be swivelled through a certain angle and to provide a stop in each end region of the angle of swivel, which enables an interlocking entrainment of the segments by the switching member in the respective direction of rotation.

For the radial displacement of the segments by the switching member, different embodiments are conceivable. In a first variant, each segment has at least one wedge surface inclined in the peripheral direction, against which an actuating element connected with the switching member abuts. If the segments are arranged concentrically with the switching member, the actuating elements can be in the form of lugs connected with the switching member or, with a view to reducing friction, in the form of rollers arranged in pockets of an actuating element cage which is rigidly connected with the switching member. In the case of an equiaxial or concentric arrangement of switching member and segments, it is possible to couple one of the segments in each case with the switching member by means of at least one toggle joint.

In another embodiment, which is easy to manufacture and therefore inexpensive, each segment is provided with at least one tapered surface inclined in the axial direction against which the conical surface of the switching member itself or of a conical ring connected with the switching member, abuts. The segments and the conical surface of the switching member are displaceable relative to each other in the axial direction, the relative displacement being effected by an appropriate coupling of the segments with the switching member. This coupling consists, for example, in that each segment is provided with a helical axial end face against which at least one actuating element connected with the switching member abuts. A further variant of the embodiment consists in arranging the segment actuation between the clamping paths, which, however, requires that the segments be pre-tensioned in the direction of decreasing the distance between the clamping paths while the segment actuation by the switching member acts in the direction of increasing the distance between the clamping paths.

In principle, the actuating means described for the radial displacement of the segments can be used independently of whether the outer or the inner clamping ring consists of segments and whether a clamping roller freewheel or a clamping element freewheel is used. However, with a view to minimizing design space, it appears to be appropriate to use a clamping roller freewheel in which the inner clamping ring consists of several segments and a shaft arranged concentrically within the inner clamping ring is employed as switching member.

In not so highly loaded constructions, it is possible to provide the clamping ramps of the clamping roller freewheel at the clamping path of the outer clamping ring while the outer surfaces of the inner clamping ring consisting of segments are smooth. Since in this case the clamping rollers rotate relative to the segments, it seems better, when higher loads are involved, to provide one clamping ramp at the outer surface of each segment, the clamping rollers associated with these clamping ramps being arranged in a cage which prevents relative movements of the clamping rollers beyond the extent of the segments in the peripheral direction. Such a clamping roller cage is therefore either rigidly connected with the shaft, or in the case of segment actuation by means of rollers arranged in an actuating element cage, is made in one piece with this actuating element cage.

In clamping roller overrunning clutches of the last-mentioned types, it is conceivable, in principle, to pretension the segments radially outwards, to provide wedge surfaces at the outer surfaces of the segments and to form the cage itself as a switching member by providing it with lugs abutting against the wedge surfaces. For a possible application of the overrunning clutch described above, the shaft designed as a switching member is connected with a driving element and the inner clamping ring consisting of segments is connected with a driven element, while the outer clamping ring is arranged, secure against rotation, in a carrying construction. Moreover, the overrunning clutch can also be designed to be switchable in two directions.

Figure 2:
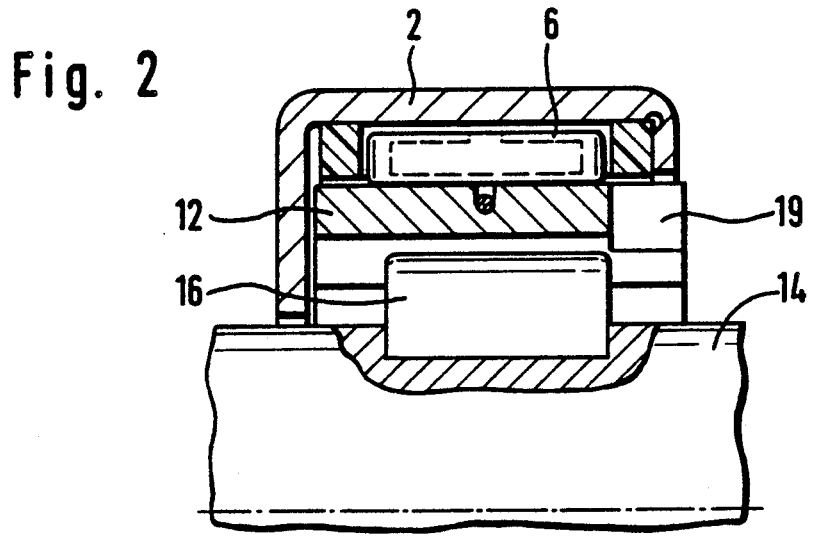
Figure 3:
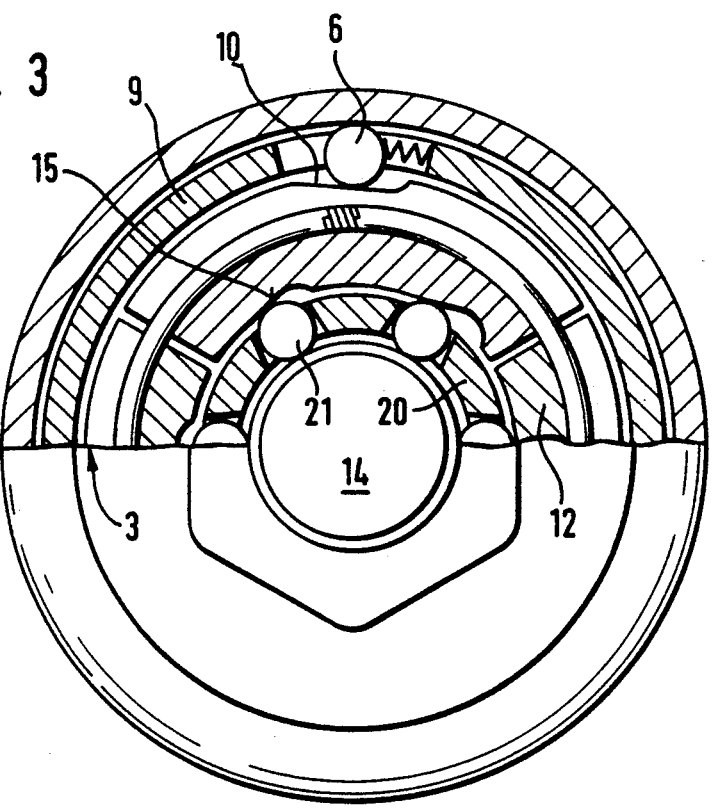
Figure 4:
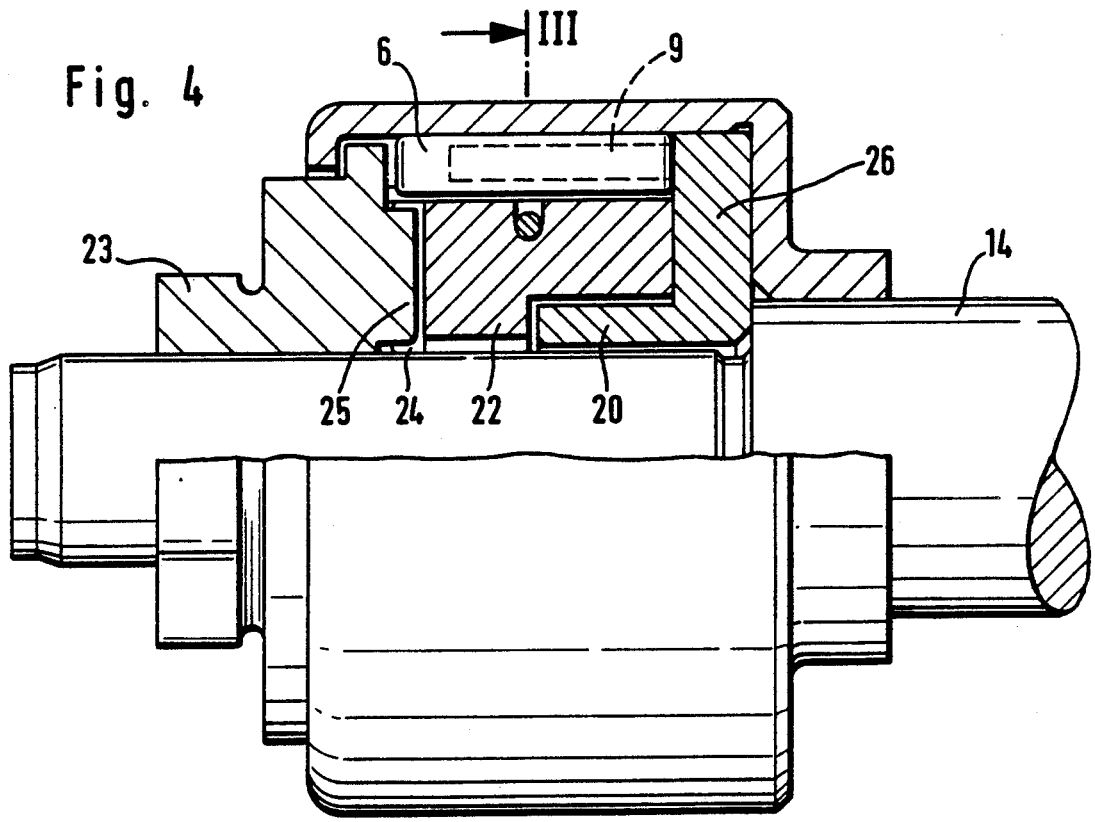
Figure 5:
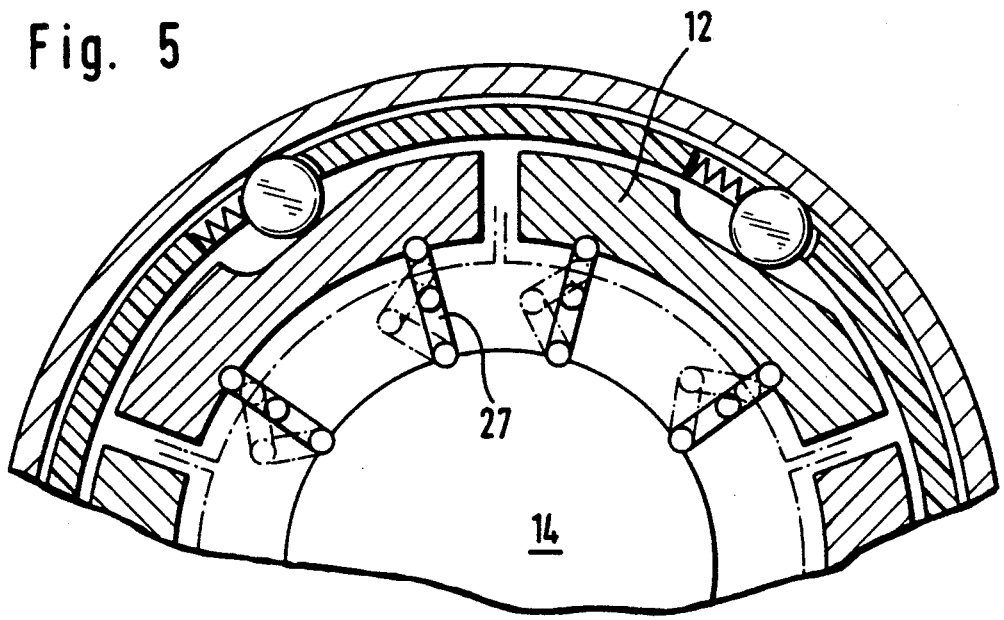
Figure 6:
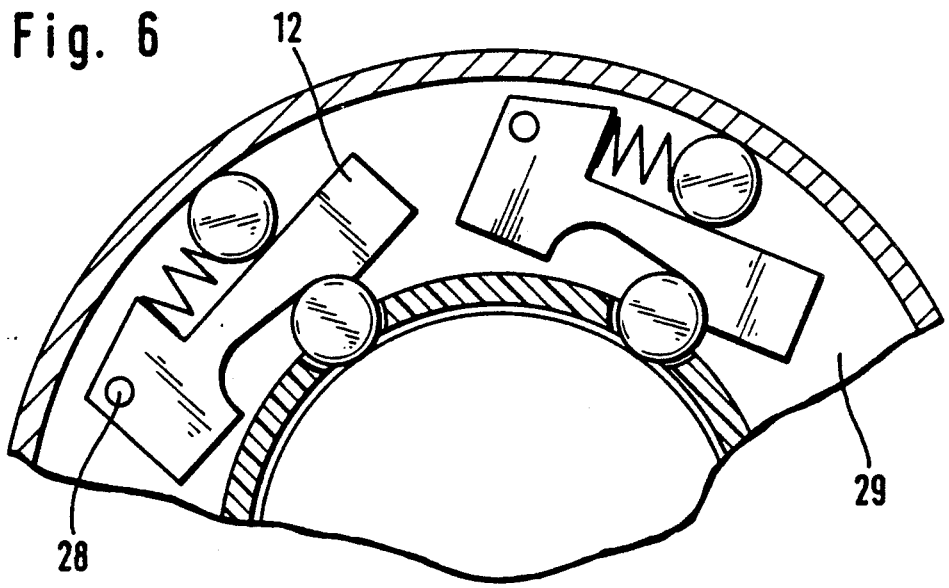
Figure 7:
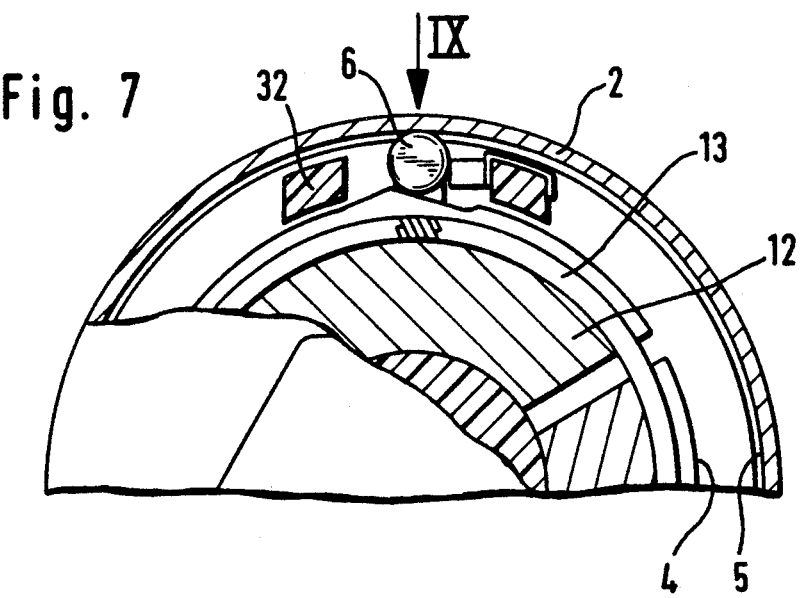
Figure 8:
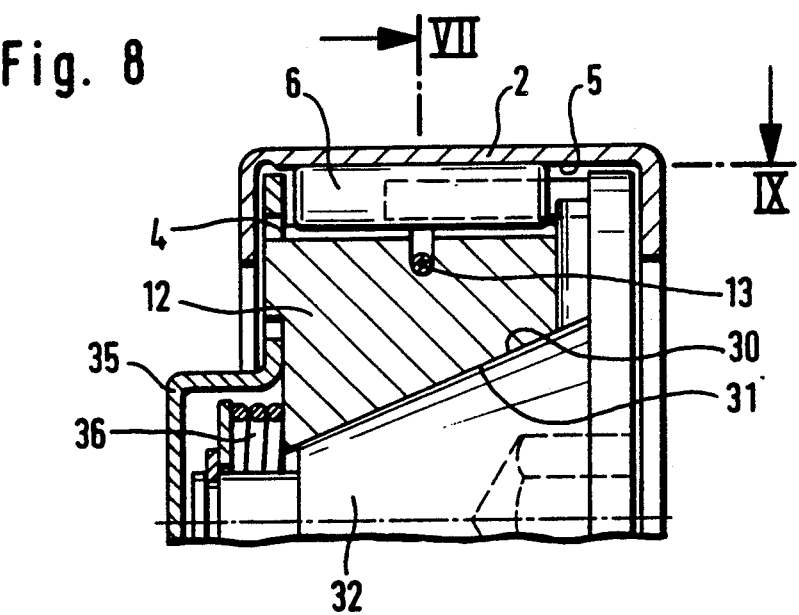
Figure 9:
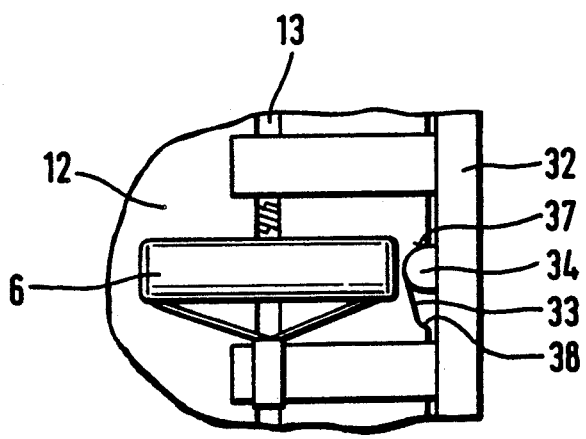
Figure 10:
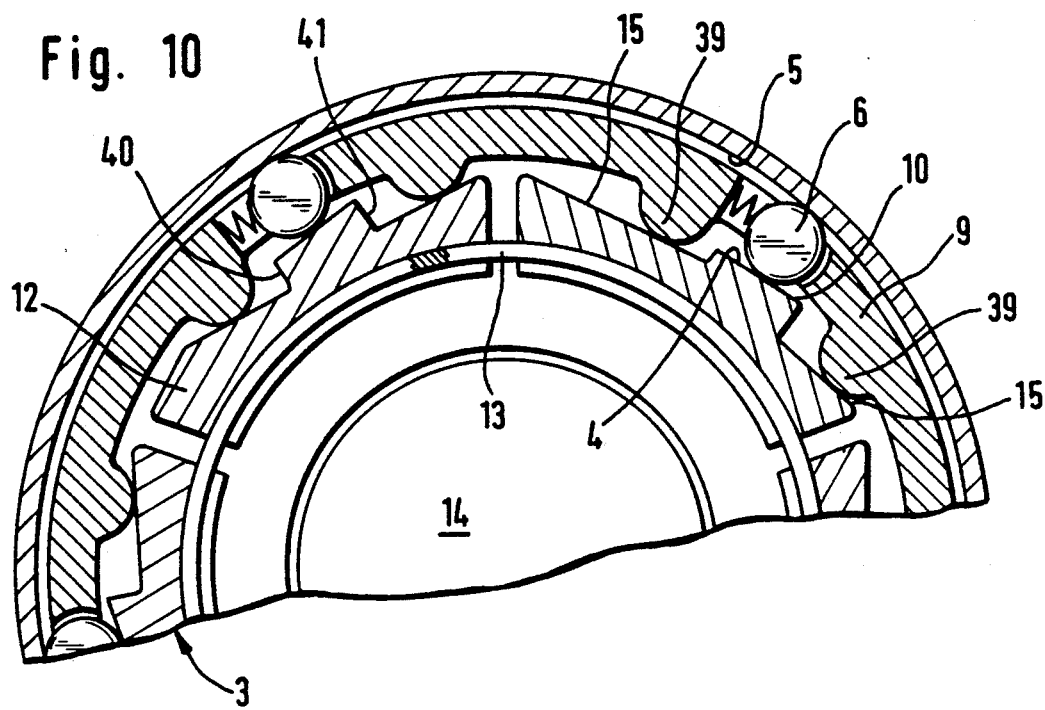
Figure 11:
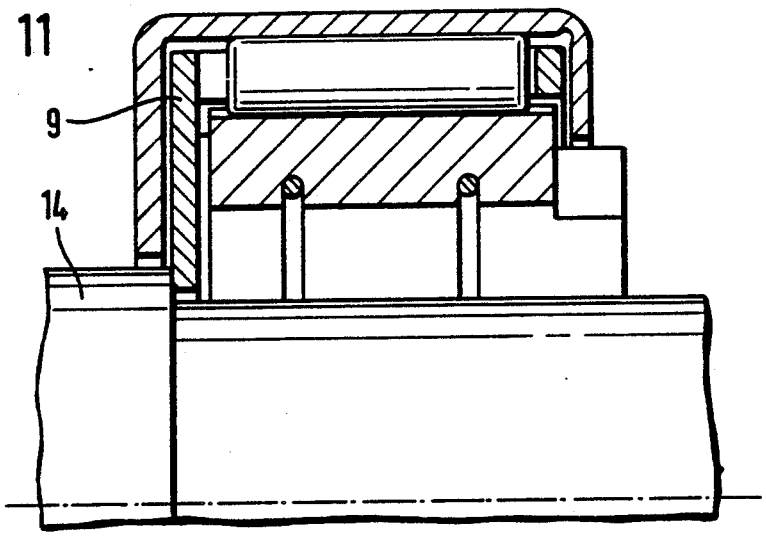

Referring now to the drawings:

FIG. 1 is a cross-sectional view of a clamping roller overrunning clutch with outer star and segment actuation by means of lugs attached to the shaft, FIG. 2 is a partial longitudinal cross-section of an overrunning clutch of FIG. 1, FIG. 3 is a partial cross-sectional view of a clamping roller overrunning clutch with segment actuation by means of rollers arranged in a cage connected rigidly with a shaft, FIG. 4 is a longitudinal section of the overrunning clutch of FIG. 3, FIG. 5 is a partial cross-section of a clamping roller overrunning clutch with segment actuation by means of toggle levers, FIG. 6 is a clamping roller overrunning clutch with tiltably mounted swivelling segments, FIG. 7 is a partial cross-section of a clamping roller overrunning clutch with segment actuation by means of conical surfaces, FIG. 8 is a longitudinal section of the clamping roller overrunning clutch of FIG. 7, FIG. 9 is a partial top view of a clamping roller overrunning clutch of FIGS. 7 and 8, FIG. 10 is a cross-section of a clamping roller overrunning clutch with segment actuation by the cage, and FIG. 11 is a longitudinal section of the clamping roller overrunning clutch of FIG. 10.

FIG. 1 shows the cross-section of a load-switching overrunning clutch 1 in which the outer clamping ring 2 and the inner clamping ring 3 are arranged concentrically in each other and provided with mutually facing clamping paths 4,5 between which clamping rollers 6 are arranged in the pockets 7 of the clamping roller cage 9 where they are retained in a ready-to-clamp position by the springs 8. The outer clamping path 5 is provided with clamping ramps 10 inclined in the peripheral direction with which ramps the clamping rollers 6 are associated, the lugs 11 of the clamping roller cage 9 likewise engaging in axial extensions of the ramps 10 and thus fixing the clamping roller cage 9 relative to the outer clamping ring 2. The inner clamping ring 3 is variable in diameter and consists of the segments 12 whose outer surfaces are concentric, each one forming a part of the clamping path 4. The segments 12 themselves are pretensioned radially inwards by the spring 13 in the direction of increasing the distance between the clamping paths 4,5, and are arranged concentrically around the shaft 14. On its inner surface facing the shaft 14, each segment 12 has a wedge surface 15 inclined in the peripheral direction against which a lug 16 connected with the shaft abuts in each case. At the ends of the wedge-surfaces 15, stop faces 17, 18 are provided which enable an interlocking entrainment of the segments 12 by the shaft 14 in the respective direction of rotation at the end of the swivelling range determined by the extent of the wedge surface 15 in the peripheral direction. In the longitudinal section of this clamping roller overrunning clutch represented in FIG. 2, the axial extent of the individual components can be seen. The radially extending groove 19 at the segments 12 serves to connect the segments 12 with a driven element, not shown, while the shaft 14 can be connected e.g. by an interference fit, with a driving element and the outer clamping ring is inserted into a carrying construction.

Such an overrunning clutch functions as follows: Starting from the position shown in FIG. 1, a driving moment at the shaft 14 in the anti-clockwise direction effects an entrainment of the segments 12 by the lugs 16 which bear against the stop face 17 so that the driving moment is transmitted directly via the segments 12 and the grooves 19 to a driven element. Although the clamping rollers 6 are retained by the springs 8 in a ready-to-clamp position, they still permit a free rotation of the inner clamping ring 3. In the case of a driving moment at the shaft 14 in the clockwise direction, the shaft 14 swivels at first to the extent determined by the length of the wedge surfaces 15 at the segments 12 till the lugs 16 bear against the stop face 18 during which time the segments 12 are displaced radially inwards under the action of the spring 13 and increase the distance between the clamping paths 4,5. In spite of the rotation of the inner clamping ring 3 in the clamping direction, the clamping rollers 6 cannot block the freewheel so that the rotating movement is transmitted from the shaft 14 to the driving element.

If, now, a moment in the clockwise direction at the driven element is applied via the grooves 19 to the inner clamping ring 3, the shaft 14 swivels at first relative to the segments 12 which, as a result of the movement of the lugs 16 relative to the wedge surfaces 15, are displaced radially outwards. By reason of the thus again reduced distance between the clamping paths 4,5 the clamping rollers are now in the clamping position and block a rotation of the inner clamping ring 3 relative to the outer clamping ring 2. Such an arrangement can be used, for example, as a driving device for the moving of window panes in automotive vehicles in which the shaft 14 is connected for instance, with a crank handle and the inner clamping ring 3, with the lifting mechanism. With the crank handle, the window can be operated both in the raising and the lowering direction whereas, if a moment is applied at the window e.g. in the opening direction of the window, the clamping roller overrunning clutch locks and prevents an unauthorized pushing-down of the window.

FIGS. 3 and 4 show a similar clamping roller overrunning clutch in cross-section and longitudinal section respectively. This construction differs from FIGS. 1 and 2 by the fact that a clamping ramp 10 is arranged on the outer surface of each segment 12 and the clamping roller cage 9 is connected with the segments 12 of the inner clamping ring 3 so as to be able to swivel through a certain angle. The segment actuation is effected via the actuating rollers 21 arranged in an actuating element cage 20 which is rigidly connected with the shaft 14, the actuating rollers 21 abutting against the wedge surfaces 15, inclined in the peripheral direction, of the segments 12. In this embodiment, the interlocking entrainment of the segments 12 by the shaft 14 in the respective end region of the angle of swivel is assured by the segment surfaces 22 which, in the axial direction, extend over half the length of the actuating rollers 21 down to the shaft. For the coupling of the segments 12 with the driven element 23, the lugs 25 attached to the driven element 23 engage in the radial grooves 24. The actuating element cage 20 and the clamping roller cage 9 are connected integrally with each other and with the shaft 14 by the adjusting disc 26.

By reason of the coupling of the clamping roller cage 9 with the shaft 14 in the embodiment of FIGS. 3 and 4, the advantage is obtained that besides the switching-free of the clamping roller freewheel by the lowering of the segments 12, the clamping rollers 6 are at the same time pushed out of the clamping range of the clamping ramps 10 by a relative rotation of the clamping roller cage 9 which results in extremely short switching paths. The segments are stabilized against tilting in the peripheral direction by the association of two actuating elements 21 with each segment.

An alternative method of segment actuation in the form of a toggle joint 27 between the segments 12 and the shaft 14 is illustrated in FIG. 5. FIG. 6 illustrates a special design of the segments 12 in the form of swivelling segments which in this case are swivellably mounted at a disc-shaped driven element 29 by means of pins 28.

FIGS. 7, 8 and 9 show a longitudinal section, a cross-section and a partial view of a clamping roller overrunning clutch with segment actuation via conical surfaces 30, 31. The basic design of the clamping roller overrunning clutch with the outer clamping ring 2, the clamping rollers 6 and the segments 12 corresponds substantially to that of FIG. 3, except at their peripheral surface facing the shaft 14, the segments 12 are provided with a tapered surface 30 inclined in the axial direction against which the conical surface 31 of the switching member 32 bears. The segments 12 and the switching member 32 are longitudinally displaceable relative to each other, each segment 12 being provided with a helical end face 33 against which an axial actuating cam 34 attached to the switching member 32 abuts. The segments 12 are connected with the driven element 35 so as to be displaceable in the radial direction, and to a limited extent, also in the longitudinal direction. They are held together by the spring 13 and loaded by the helical spring 36 in the axial direction so that a pre-tension in the direction of decreasing the distance between the clamping paths 4,5 results. At a relative rotation of switching member 32 and segments 12 in the position shown, the actuating cams 34 and the end face 33 displace the segments axially relative to the switching member 32 in the direction of increasing the distance between the clamping paths 4,5. The segments 12 are again swivellably mounted on the switching member 32, the stops 37, 38 at the ends of the end face 33 providing for an interlocking entrainment of the segments 12 by the switching member 32.

In FIGS. 10 and 11, a clamping roller overrunning clutch is illustrated in which the segments 12 again form the inner clamping ring 3 but are pre-tensioned in the direction of decreasing the distance between the clamping paths 4,5 by a spring 13, which in this case is in the form of a spreader spring. At the outer surface of the segments 12, clamping ramps are provided which correspond to the clamping rollers 6 arranged in the clamping roller cage 9. Next to the clamping ramps 10 in the peripheral direction, wedge surfaces inclined in the peripheral direction are provided against which actuating lugs 39 rigidly connected with the clamping roller cage 9 abut so that, at a relative rotation of clamping roller cage 9 and segments 12 these segments are displaced in the radial direction. In this example of embodiment, the clamping roller cage 9 is designed at the same time as a switching member and connected rigidly with the shaft 14. The interlocking entrainment of the segments 12 by the shaft 14 is effected via the stops 40, 41 against which the actuating lugs 39 can bear in each case.

Besides the examples of embodiment shown here, other variants of segment actuation functioning in a similar manner are conceivable, to be sure, as well in the case of an arrangement of segments as outer clamping ring as also as inner clamping ring. Possibilities of application are found, for example, not only in the already mentioned driving devices for the operation of window panes in automotive vehicles but also in automatic transmissions of four wheel-drive automotive vehicles. Further, an application in overrunning clutches switchable in two directions is conceivable, if instead of one clamping ramp, two clamping ramps inclined in opposite directions are made to correspond to each clamping roller.

What is claimed is:

1. An overrunning clutch comprising clamping rings arranged concentrically one within the other and having mutually facing clamping paths between which clamping elements are arranged, one of said clamping rings comprising at least one axial slit to make it variable in diameter, said ring with variable diameter being acted upon by virtue of a wedge-surface effect by a switching member arranged equiaxially with it, so that a rotation of the switching member relative to the clamping ring with variable diameter causes a change in the distance between the clamping paths, said clamping ring with variable diameter being pre-tensioned by at least one spring to oppose the change in distance between the clamping paths which can be effected by the switching member, characterized in that the clamping elements and the clamping paths are so designed that a rotation of the clamping paths relative to each other in at least one direction of rotation effects a clamping of the clamping elements between the clamping paths by virtue of a wedge effect, the clamping elements being pre-tensioned in said direction of rotation, designated as clamping direction, by a spring, the clamping ring with variable diameter being formed of several segments radially moveable independently of each other, the segments being mounted at the switching member so as to be able to swivel through a certain angle and in each end region of the angle of swivel, a stop is provided which assures an interlocking entrainment of the segments by the switching member in the respective direction of rotation.

2. An overrunning clutch of claim 1 wherein the segments are provided with at least one wedge surface inclined in the peripheral direction, against which an actuating element connected with the switching member abuts.

3. An overrunning clutch of claim 2 wherein the segments are arranged concentrically with the switching member.

4. An overrunning clutch of claim 3 wherein the actuating elements are in the form of lugs connected with the switching member.

5. An overrunning clutch of claim 3 wherein the actuating elements are in the form of rollers arranged in pockets of an actuating element cage rigidly connected with the switching member.

6. An overrunning clutch of claim 1 wherein at least one toggle joint is provided between each of the segments and the switching member.

7. An overrunning clutch of claim 1 wherein the segments are radially pre-tensioned in the direction of increasing the distance between the clamping paths by said at least one spring.

8. An overrunning clutch of claim 1 wherein the segments are provided with at least one tapered surface inclined in the axial direction, against which the conical surface of a switching member longitudinally displaceable relative to the segments abuts.

9. An overrunning clutch of claim 8 wherein each segment is provided with two tapered surfaces inclined in opposite directions against each of which a conical ring coupled with the switching member abuts.

10. An overrunning clutch of claim 8 wherein the segments are coupled with the switching member so as to be axially displaced at a relative rotation between switching member and segments.

11. An overrunning clutch of claim 8 wherein the segments are provided with a helical axial end face, against which at least one actuating cam coupled with the switching member abuts.

12. An overrunning clutch of claim 8 wherein the segments are radially pre-tensioned in the direction of decreasing the distance between the clamping paths by at least one spring.

13. An overrunning clutch of claim 12 wherein the clamping elements are lodged in a cage which is designed as a switching member.

14. An overrunning clutch of claim 1 wherein clamping elements are clamping rollers lodged in a cage and pre-tensioned in the clamping direction, one of the clamping paths is provided with clamping ramps cooperating with the clamping rollers and the segments form the inner clamping ring, the switching member being in the form of a shaft arranged concentrically within the inner clamping ring.

15. An overrunning clutch of claim 14 wherein the clamping ramps are arranged on the clamping path of the outer clamping ring.

16. An overrunning clutch of claim 14 wherein one clamping ramp is arranged at the outer surface of each segment.

17. An overrunning clutch of claim 16 wherein the clamping roller cage is rigidly connected with the switching member.

18. An overrunning clutch of claim 14 wherein the switching member is connected with a driving element and the inner clamping ring is connected with a driven element, while the outer clamping ring is connected, secure against rotation, with a carrying construction.

* * * * *